(12) United States Patent
Glahn et al.

(10) Patent No.: US 11,519,285 B2
(45) Date of Patent: Dec. 6, 2022

(54) BELLOWS SECONDARY SEAL FOR CANTILEVERED HYDROSTATIC ADVANCED LOW LEAKAGE SEAL

(71) Applicant: United Technologies Corporation, Farmington, CT (US)

(72) Inventors: Jorn Axel Glahn, Manchester, CT (US); Brian F. Hilbert, Coventry, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 92 days.

(21) Appl. No.: 16/410,072

(22) Filed: May 13, 2019

(65) Prior Publication Data

US 2020/0362716 A1 Nov. 19, 2020

(51) Int. Cl.
*F01D 11/04* (2006.01)
*F16J 15/36* (2006.01)

(52) U.S. Cl.
CPC .............. *F01D 11/04* (2013.01); *F16J 15/36* (2013.01); *F05D 2220/32* (2013.01); *F05D 2240/55* (2013.01)

(58) Field of Classification Search
None
See application file for complete search history.

(56) References Cited

U.S. PATENT DOCUMENTS

| 4,966,532 | A | 10/1990 | Fengsheng | |
| 9,115,810 | B2 | 8/2015 | Bidkar et al. | |
| 9,359,908 | B2 | 6/2016 | Bidkar et al. | |
| 9,587,746 | B2 | 3/2017 | Bidkar et al. | |
| 10,190,431 | B2 | 1/2019 | Bidkar et al. | |
| 2008/0309019 | A1* | 12/2008 | Wolfe | F16J 15/3288 277/420 |
| 2014/0119912 | A1* | 5/2014 | Bidkar | F16J 15/442 415/229 |
| 2016/0010480 | A1 | 1/2016 | Bidkar et al. | |
| 2018/0363499 | A1* | 12/2018 | Smoke | F01D 5/225 |

FOREIGN PATENT DOCUMENTS

EP 3043092 A1 7/2016

OTHER PUBLICATIONS

European Search Report for Application No. 20 17 3019; dated Sep. 24, 2020.

* cited by examiner

*Primary Examiner* — Katheryn A Malatek
*Assistant Examiner* — Alyson Joan Harrington
(74) *Attorney, Agent, or Firm* — Cantor Colburn LLP

(57) ABSTRACT

A hydrostatic seal configured to be disposed between relatively rotatable components. The hydrostatic seal includes a seal carrier. The hydrostatic seal also includes a beam extending axially from a forward end to an aft end, the beam cantilevered to the seal carrier at one of the forward end and the aft end, the beam free at the other end. The hydrostatic seal further includes a bellows seal operatively coupled to the seal carrier and in contact with the beam.

13 Claims, 3 Drawing Sheets

BELLOWS SECONDARY SEAL FOR CANTILEVERED HYDROSTATIC ADVANCED LOW LEAKAGE SEAL

BACKGROUND

Exemplary embodiments pertain to the art of gas turbine engines and, more particularly, to a bellows secondary seal for a cantilevered hydrostatic seal.

Hydrostatic seals exhibit less leakage compared to traditional knife edge seals while exhibiting a longer life than brush seals. Some hydrostatic seals may be used between a stator and a rotor within a gas turbine engine. The hydrostatic seal is mounted to the stator to maintain a desired gap dimension between the hydrostatic seal and the rotor. The hydrostatic seal has the ability to 'track' the relative movement between the stator and the rotor throughout the engine operating profile when a pressure differential is developed across the seal.

Hydrostatic seals involve motion of a spring-attached shoe with a response based on aerodynamic forces developed between the seal shoe and a rotor surface during operation. The hydrostatic seals include one or more secondary seals loaded against a free end of the shoe, and possibly other structural components of the overall seal assembly. The need for reliable secondary sealing options is recognized for hydrostatic seals, particularly those with a cantilevered shoe. Such seals include compliant beam elements that are separated by gaps. Reducing leakage across these gaps to avoid a potentially significant performance penalty is desirable.

BRIEF DESCRIPTION

Disclosed is a hydrostatic seal configured to be disposed between relatively rotatable components. The hydrostatic seal includes a seal carrier. The hydrostatic seal also includes a beam extending axially from a forward end to an aft end, the beam cantilevered to the seal carrier at one of the forward end and the aft end, the beam free at the other end. The hydrostatic seal further includes a bellows seal operatively coupled to the seal carrier and in contact with the beam.

In addition to one or more of the features described above, or as an alternative, further embodiments may include that the bellows seal is disposed between a radially inward surface of the seal carrier and a radially outward surface of the beam.

In addition to one or more of the features described above, or as an alternative, further embodiments may include that the bellows seal extends longitudinally in a direction perpendicular to a radially outer surface of the beam.

In addition to one or more of the features described above, or as an alternative, further embodiments may include that the beam includes a flange extending radially outwardly into a region at least partially defined by the seal carrier and the beam, the flange oriented at an angle between parallel and perpendicular to a radially outer surface of the beam, the bellows seal in contact with the flange.

In addition to one or more of the features described above, or as an alternative, further embodiments may include that a first end of the bellows seal is operatively coupled to the seal carrier and a second end of the bellows seal is in contact with a forward face of the flange.

In addition to one or more of the features described above, or as an alternative, further embodiments may include that the bellows seal is slotted to allow deflection of the beam.

In addition to one or more of the features described above, or as an alternative, further embodiments may include that the beam is cantilevered to the seal carrier at the forward end of the beam.

In addition to one or more of the features described above, or as an alternative, further embodiments may include that the beam is cantilevered to the seal carrier at the aft end of the beam.

In addition to one or more of the features described above, or as an alternative, further embodiments may include that the bellows seal is in contact with the beam proximate the end of the beam that is free.

Also disclosed is a seal assembly disposed in a gas turbine engine. The seal assembly includes a stator, a rotor, and a hydrostatic seal disposed between the stator and the rotor. The seal includes a seal carrier. The seal also includes a beam extending axially from a forward end to an aft end, the beam cantilevered to the seal carrier at one of the forward end and the aft end, the beam free at the other end. The seal further includes a slotted bellows seal extending longitudinally from a first end to a second end, the first end operatively coupled to the seal carrier at the first end.

In addition to one or more of the features described above, or as an alternative, further embodiments may include that the bellows seal is disposed between a radially inward surface of the seal carrier and a radially outward surface of the beam.

In addition to one or more of the features described above, or as an alternative, further embodiments may include that the bellows seal extends longitudinally in a direction perpendicular to a radially outer surface of the beam.

In addition to one or more of the features described above, or as an alternative, further embodiments may include that the second end of the bellows seal is in contact with a radially outer surface of the beam.

In addition to one or more of the features described above, or as an alternative, further embodiments may include that the beam includes a flange extending radially outwardly into a region at least partially defined by the seal carrier and the beam, the flange oriented at an angle between parallel and perpendicular to a radially outer surface of the beam, the bellows seal in contact with the flange.

In addition to one or more of the features described above, or as an alternative, further embodiments may include that the beam is cantilevered to the seal carrier at the forward end of the beam.

In addition to one or more of the features described above, or as an alternative, further embodiments may include that the beam is cantilevered to the seal carrier at the aft end of the beam.

In addition to one or more of the features described above, or as an alternative, further embodiments may include that the bellows seal is in contact with the beam proximate the end of the beam that is free.

Further disclosed is a gas turbine engine including a compressor section, a combustor section, a turbine section, and a seal assembly disposed in the gas turbine engine. The seal assembly includes a stator, a rotor, and a hydrostatic seal disposed between the stator and the rotor. The hydrostatic seal includes a seal carrier. The hydrostatic seal also includes a beam extending axially from a forward end to an aft end, the beam cantilevered to the seal carrier at the aft end, the beam free at the forward end. The hydrostatic seal further includes a bellows seal in contact with the seal carrier and in contact with the beam.

In addition to one or more of the features described above, or as an alternative, further embodiments may include that the bellows seal is slotted to allow deflection of the beam.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
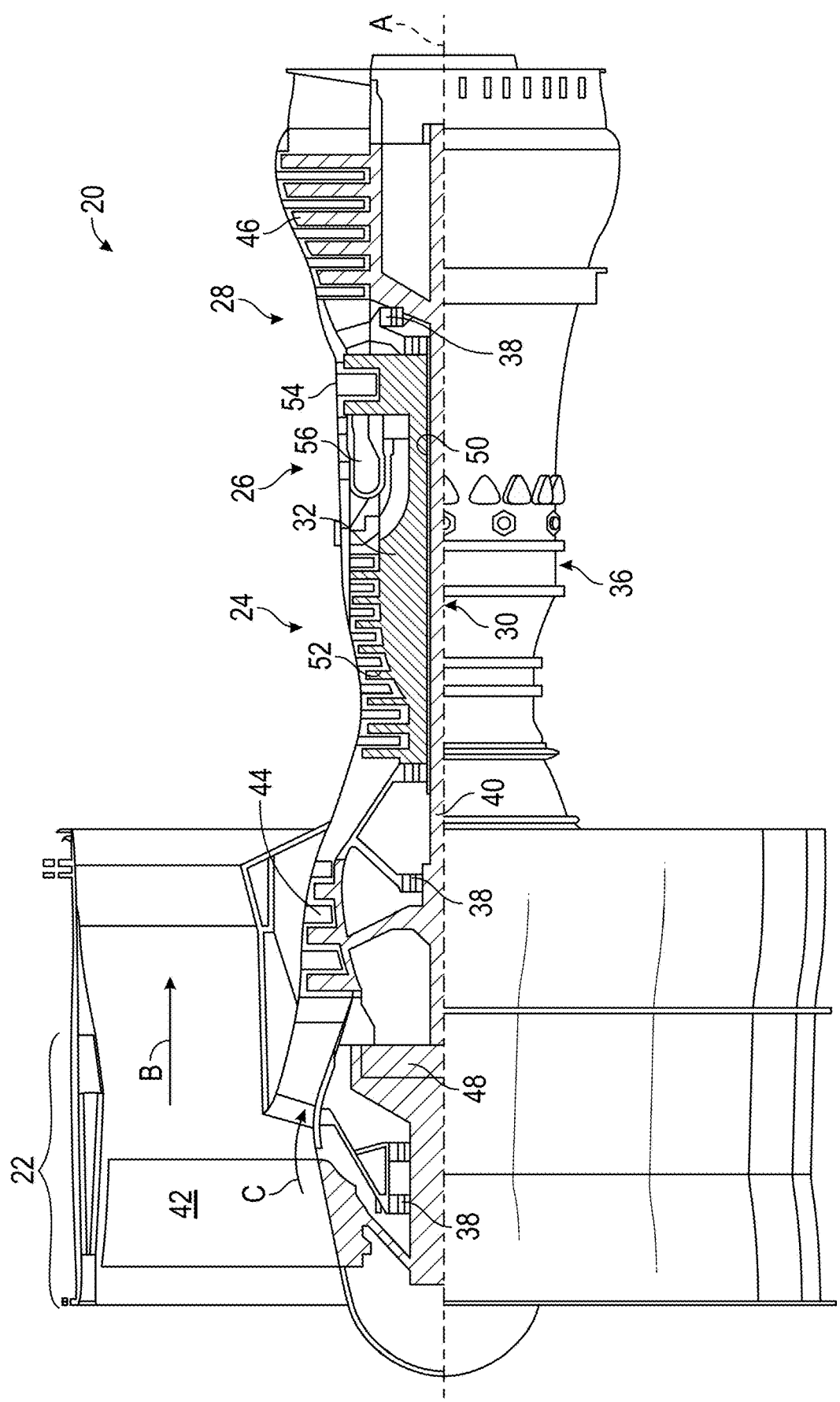
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 m/sec).

Figure 2A:
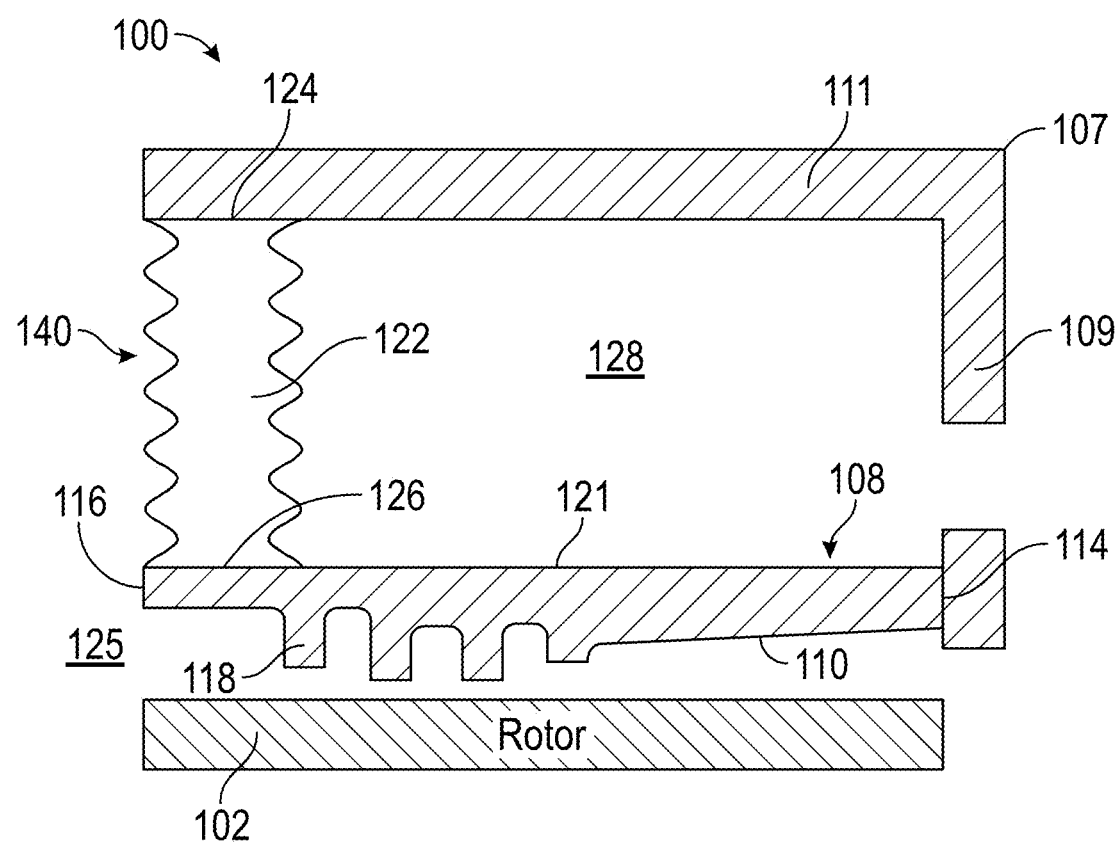
FIGS. 2A and 2B are side, elevational, cross-sectional views of a hydrostatic seal assembly according to aspects of the disclosure.

FIG. 2A illustrates a hydrostatic seal indicated generally at 100. The hydrostatic seal 100 is intended to create a seal between two relatively rotating components, such as a fixed stator and a rotating rotor 102. The hydrostatic seal 100 includes a carrier 107 and a beam 108, which is located in a non-contact position along the exterior surface of the rotor 102. The beam 108 is formed with a sealing surface 110. For purposes of the present disclosure, the term "axial" or "axially spaced" refers to a direction along the rotational axis of the rotor, whereas "radial" refers to a direction perpendicular to the rotational axis of the rotor.

Rather than relying on the structural stiffness of the beam 108, the embodiments described herein include a cantilevered beam as the beam 108. Therefore, the beam 108 is connected to the carrier 107 of the seal 100 in a pinned manner or some suitable alternative mechanical fastener that allows pivoting movement of the beam 108, relative to the carrier 107. The carrier 107 is fixed to a static structure (not shown). In the illustrated embodiments, the beam 108 is pinned (i.e., cantilevered) to the carrier 107 at a rear axial end 114 of the beam 108, while a forward axial end 116 of the beam 108 is free and not operatively coupled to any other structure. The carrier 107 includes a first segment 109 extending radially and a second segment 111 extending axially forward from the first segment 109.

Figure 2B:
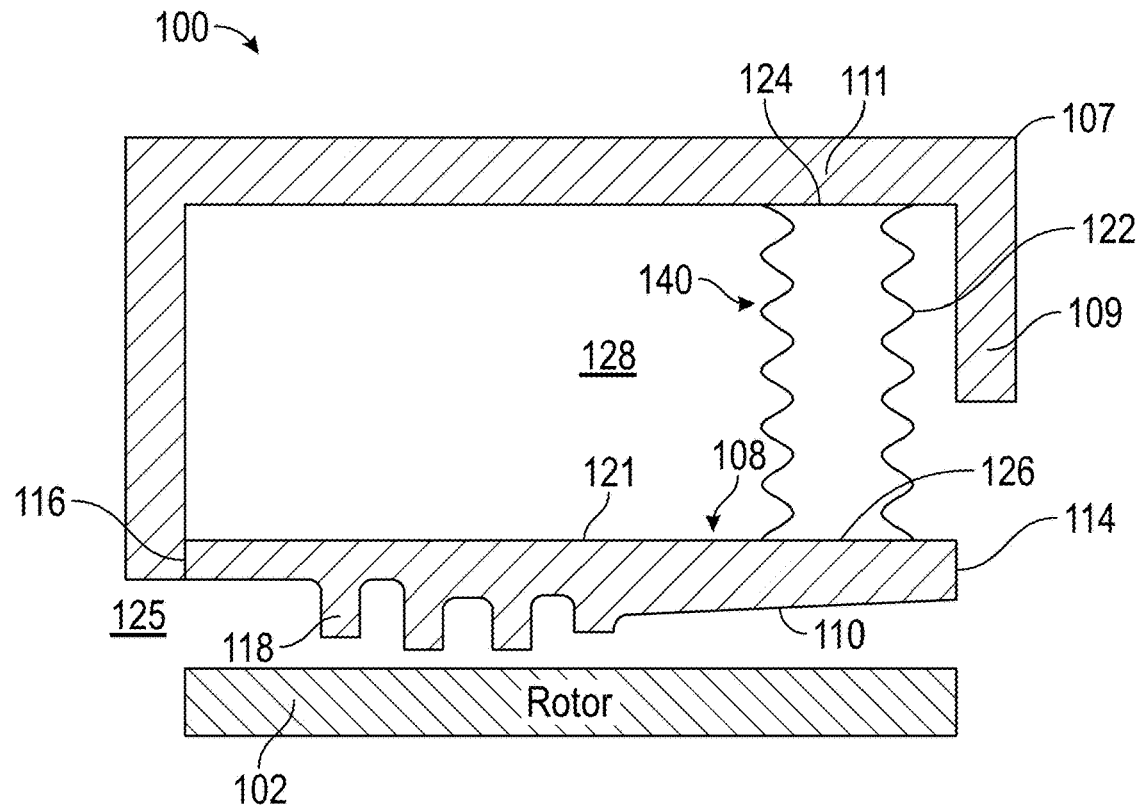

In the illustrated embodiment (FIG. 2A), the rear axial end 114 of the beam 108 is cantilevered to the first segment 109 of the carrier 107 to form a substantially open front end. However, it is to be appreciated that the beam 108 may be operatively connected to the carrier 107 at an opposite end of the beam 108 (FIG. 2B). In particular, the front end 116 of the beam 108 is pinned, or otherwise cantilevered, to the carrier 107 in some embodiments, with the front end 116 connected to the carrier 107.

The initial assembly location of the beam 108 has a defined radial gap between the beam 108 and the rotating surface. One or more teeth 118 are included on the sealing surface 110 of the beam 108. In operation, as the airflow between the beam 108 and rotor 102 increases, the pressure field under the teeth 118 will be dropped to a lower pressure than the exit pressure in a region aft of the teeth 118. The reduction in pressure across the beam 108 causes a net aerodynamic force acting on the beam 108 such that the force balance between the aerodynamic forces on the outer diameter 121 of the beam 108 and the inner diameter, i.e., sealing surface 110, causes the beam 108 to be moved radially inwardly toward the rotor 102, thus decreasing the gap until the seal reaches an equilibrium position considering the increased structural force of the displaced cantilevered beam. Conversely, in operation, when the gap closes below a desired level, the aerodynamic force on the sealing surface 110 across the beam 108 increases, causing an increase in radial pressure force, which overcomes the force on the outer diameter 121, thus forcing the beam 108 radially outwardly from the rotor 102 until the seal reaches an equilibrium position considering the structural force of the displaced cantilevered beam. The cantilevered beam 108 deflects and moves to create a primary seal of the gap between the rotor and stator within predetermined design tolerances.

The cantilevered seals described herein are more robust to wear, when compared to prior hydrostatic seals that have contact between stationary and moving components that, due to friction, can cause the shoe to become fully or partially pinned in place, and be unable to avoid contact with the rotor during a transient maneuver. In prior hydrostatic seals, large normal loads developed at operating conditions are reacted at a sliding interface between the shoe and carrier backing plate. The cantilevered seals provide a way of transmitting axial forces in a manner independent of the shoe radial motion, as the differential pressure is reacted through the cantilever. The seals described herein are designed to eliminate rotor contact. Frictional loads are difficult to characterize and can change over the life of the seal and lead to flutter. The cantilevered seals described herein avoid such problems.

The embodiments disclosed herein include a secondary seal in the form of a bellows seal 122 that is provided proximate the free end of the beam 108 (i.e., closer to the free end than the secured end of the beam). In the illustrated embodiments, the free end is the axially forward end 116, but the reverse may be true, as described above in detail. It is to be appreciated that some embodiments are contemplated to include more bellows seals to define a bellows seal assembly or only one bellows seal. For purposes of descriptive brevity, a single bellows seal is described herein. The bellows seal 122 provides a seal between the illustrated high pressure region 125 and the low pressure region 128 in a space radially outward of the beam 108. The bellows seal 122 includes a plurality of slots 140 radially spaced in the longitudinal direction of the seal to enable and accommodate radial deflections of the beam 108 during operation.

As shown, the bellows seal 122 extends longitudinally from a first end 124 to a second end 126. In the illustrated embodiment of FIG. 2A, the bellows seal 122 extends longitudinally in a substantially radial direction that is substantially perpendicular to the outer diameter surface of the beam 108. The bellows seal 122 is sandwiched between the second segment 111 of the carrier 107 and the beam 108. Securing of the bellows seal 122 may be facilitated by operative (e.g., direct or indirect) coupling of the bellows seal 122 to the second segment 111 of the carrier 107 and/or the beam 108. The first and second ends 124, 126 of the bellows seal 122 may be fastened to the carrier 107 and/or the beam 108 or may simply be in abutment therewith to be in fitted interference.

Figure 3:
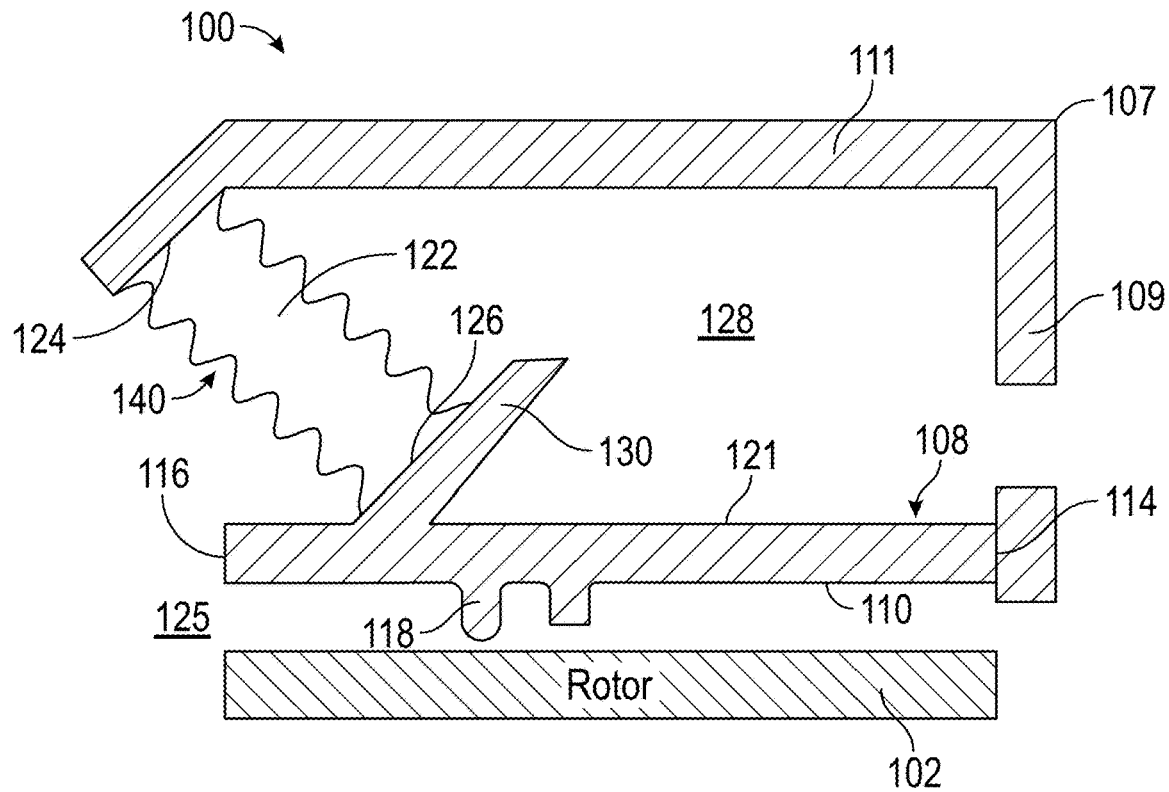
FIG. 3 is a side, elevational, cross-sectional view of the hydrostatic seal assembly according to another aspect of the disclosure.

Referring to FIG. 3, another orientation of the bellows seal 122 is illustrated. In particular, a flange 130 of the beam 108 extends radially outwardly from the beam 108 into the low pressure region 128 at least partially defined by the beam 108 and the carrier 107. The first end 124 of the bellows seal 122 is operatively coupled to the second segment 111 of the carrier 107, with the second end 126 of the bellows seal 122 in contact with the flange 130 to provide a seal. In the illustrated embodiment of FIG. 3, the flange 130 also extends axially aft such that the flange 130 is angled between parallel and perpendicular to the rotational axis of the rotor 102 to allow the bellows seal 122 to extend substantially perpendicular to a forward face of the flange 130, with the second end 126 in contact therewith. It is to be appreciated that any angle between 0 and 90 degrees is contemplated.

The bellows seal 122 utilized as the secondary seal herein is provided at the free end of the cantilevered beam 108 to reduce leakage. Although cantilevered seals may be aerodynamically unstable, the bellows seal 122 provides the benefit of additional mechanical damping. Additionally, the overall cantilevered seal and bellows seal assembly has less friction that "conventional" hydrostatic seal assemblies. The bellows seal 122 provides enough friction to dampen an aerodynamic instability without affecting seal operability.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydrostatic seal configured to be disposed between relatively rotatable components, the hydrostatic seal providing a primary seal between the relatively rotatable components, the hydrostatic seal comprising:
    a seal carrier;
    a beam extending axially from a forward end to an aft end, the beam connected to the seal carrier at the aft end, the beam having a free end at the forward end such that the beam is cantilevered with respect to the seal carrier, the beam having a sealing surface and a radially outward surface;
    one or more teeth included on the sealing surface; and
    a bellows seal operatively coupled to the seal carrier and in contact with the beam, the bellows seal extending between the seal carrier and the beam being closer to the free end than to the aft end such that the bellows seal provides a seal between a high pressure region and a lower pressure region, the high pressure region being forward of the free end, the bellows seal being closer to the free end than to the aft end and extending from the radially outward surface of the beam to the seal carrier in order to provide a secondary seal of the hydrostatic seal.

2. The hydrostatic seal of claim 1, wherein the bellows seal is disposed between a radially inward surface of the seal carrier and the radially outward surface of the beam.

3. The hydrostatic seal of claim 1, wherein the bellows seal extends longitudinally in a direction perpendicular to the radially outward surface of the beam.

4. The hydrostatic seal of claim 1, wherein the beam includes a flange closer to the free end than to the aft end, the flange extending radially outwardly into a region at least partially defined by the seal carrier and the beam, the flange oriented at an angle between parallel and perpendicular to the beam, the bellows seal in contact with the flange.

5. The hydrostatic seal of claim 4, wherein a first end of the bellows seal is operatively coupled to the seal carrier and a second end of the bellows seal is in contact with a forward face of the flange.

6. The hydrostatic seal of claim 1, wherein the bellows seal allows for deflection of the beam.

7. A seal assembly disposed in a gas turbine engine, the seal assembly comprising:
    a stator;
    a rotor; and
    a hydrostatic seal disposed between the stator and the rotor, the hydrostatic seal providing a primary seal between the stator and the rotor, the hydrostatic seal comprising:
    a seal carrier;
    a beam extending axially from a forward end to an aft end, the beam connected to the seal carrier at the aft end, the beam having a free end at the forward end such that the beam is cantilevered with respect to the seal carrier, the beam having a sealing surface and a radially outward surface;
    one or more teeth included on the sealing surface; and
    a bellows seal extending longitudinally from a first end to a second end, the bellows seal operatively coupled to the seal carrier at the first end, the bellows seal extending between the seal carrier and the beam being closer to the free end than to the aft end such that the bellows seal provides a seal between a high pressure region and a lower pressure region, the high pressure region being forward of the free end, the bellows seal being closer to the free end than to the aft end and extending from the radially outward surface of the beam to the seal carrier in order to provide a secondary seal of the hydrostatic seal.

8. The seal assembly of claim 7, wherein the bellows seal is disposed between a radially inward surface of the seal carrier and the radially outward surface of the beam.

9. The seal assembly of claim 7, wherein the bellows seal extends longitudinally in a direction perpendicular to the radially outward surface of the beam.

10. The seal assembly of claim 7, wherein the second end of the bellows seal is in contact with the radially outward surface of the beam.

11. The seal assembly of claim 7, wherein the beam includes a flange closer to the free end than to the aft end, the flange extending radially outwardly into a region at least partially defined by the seal carrier and the beam, the flange oriented at an angle between parallel and perpendicular to the beam, the bellows seal in contact with the flange.

12. A gas turbine engine comprising:
    a compressor section;
    a combustor section;
    a turbine section; and
    a seal assembly disposed in the gas turbine engine, the seal assembly comprising a stator, a rotor, and a hydrostatic seal disposed between the stator and the rotor, the hydrostatic seal providing a primary seal between the stator and the rotor, the hydrostatic seal comprising:
    a seal carrier;
    a beam extending axially from a forward end to an aft end, the beam connected to the seal carrier at the aft end, the beam having a free end at the forward end such that the beam is cantilevered with respect to the seal carrier, the beam having a sealing surface and a radially outward surface;
    one or more teeth included on the sealing surface; and
    a bellows seal in contact with the seal carrier and in contact with the beam, the bellows seal extending between the seal carrier and the beam being closer to the free end than to the aft end such that the bellows seal provides a seal between a high pressure region and a lower pressure region, the high pressure region being forward of the free end, the bellows seal being closer to the free end than to the aft end and extending from the radially outward surface of the beam to the seal carrier in order to provide a secondary seal of the hydrostatic seal.

13. The gas turbine engine of claim 12, wherein the bellows seal allows for deflection of the beam.

* * * * *